United States Patent [19]

Bambara et al.

[11] 4,209,841
[45] Jun. 24, 1980

[54] INTERFACE UNIT FACILITATING DATA EXCHANGE BETWEEN CENTRAL PROCESSOR MEMORY AND HIGH-SPEED PERIPHERAL UNIT

[75] Inventors: Mario Bambara, Milan; Aldo Ravagnati, Cesano Maderno, both of Italy

[73] Assignee: Società Italiana Telecomunicazioni Siemens S.p.A., Milan, Italy

[21] Appl. No.: 922,783

[22] Filed: Jul. 7, 1978

[30] Foreign Application Priority Data

Jul. 7, 1977 [IT] Italy ................................ 25473 A/77

[51] Int. Cl.² .............................................. G06F 3/00
[52] U.S. Cl. ................................................. 364/200
[58] Field of Search ... 364/200 MS File, 900 MS File

[56] References Cited

U.S. PATENT DOCUMENTS

| 4,040,026 | 8/1977 | Gernelle ................... | 364/200 |
| 4,067,059 | 1/1978 | Derchak .................... | 364/200 |
| 4,115,856 | 9/1979 | Labeye-Voisin et al. ..... | 364/200 |

Primary Examiner—Raulfe B. Zache
Attorney, Agent, or Firm—Karl F. Ross

[57] ABSTRACT

An interface unit, intervening in the high-speed transfer of data between an associated peripheral unit and a central memory of a processor, comprises a first and a second binary counter $CM_1$, $CM_2$ for the respective storage of memory addresses and of the number of data words to be read out from or written into a series of such addresses. In response to the arrival of an input-/output instruction from a program memory of the processor, intended for the associated peripheral unit, a first sequential network RS' controls the loading of these counters with a starting address and an initial word count; if no other peripheral unit takes precedence, a second sequential network RS" then causes transmission of the contents of the first counter $CM_1$, during successive cycles of a microroutine established by a control unit of the processor, to that processor followed by the readout (or write-in) of data words at the corresponding addresses, with incrementation of the address in counter $CM_1$ and decrementation of the word count in counter $CM_2$ at the end of each cycle. When the word count has been reduced to zero, network RS' emits a program-interruption request as a signal to the processor that the transfer has been completed.

7 Claims, 6 Drawing Figures

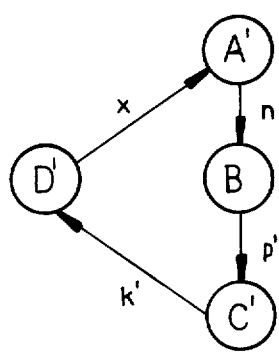
FIG.5
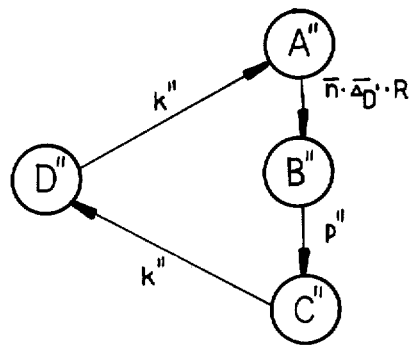
FIG.6
| OPERATIVE CODE $I_{23} - I_{16}$ | MICRO COMMANDS $I_{15} - I_{13}$ | STATE OF PERIPH. UNIT $I_{12}, I_{11}$ | FUNCTION CODE $I_{10} - I_7$ | ADDRESS OF PEPIPHERAL UNIT $I_6 - I_0$ | I/O |
FIG.3
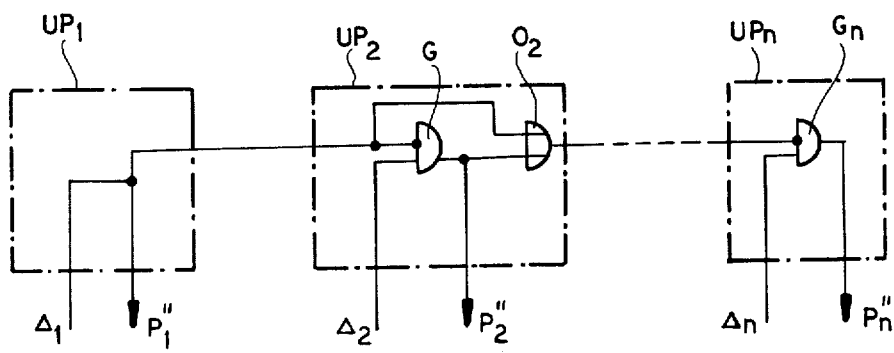
FIG.2

INTERFACE UNIT FACILITATING DATA EXCHANGE BETWEEN CENTRAL PROCESSOR MEMORY AND HIGH-SPEED PERIPHERAL UNIT

FIELD OF THE INVENTION

Our present invention relates to an electronic data-handling system and, more particularly, to an interface unit forming part of such a system to facilitate data transfer between an associated peripheral unit and a central memory of a processor serving a number of such peripheral units.

BACKGROUND OF THE INVENTION

In commonly owned U.S. patent application Ser. No. 839,883, filed Oct. 6, 1977 by one of us, Mario Bambara, jointly with Adriano Querze, there has been described a data processor dialoguing with a multiplicity of peripheral units with which the processor is able to exchange data in the presence of input/output instructions read out from a program memory. The macroinstructions stored in that memory (which also include transfer and branching instructions besides the aforementioned input/output instructions) are decoded in a control unit which establishes a subroutine on the basis of bit combinations of a current instruction, entered by the program memory in an associated register, and bit combinations of a forthcoming instruction present in the output of the memory but not yet loaded into the register. Each subroutine involves the readout of a number of microinstructions stored in another memory within the control unit itself.

Certain peripheral units (e.g. teletypewriters), when ready to transmit data to the processor, require an interruption of the program since their operating speed is slower than that of the processor. In the system of the prior Bambara et al application referred to, such program interruptions rank lower than an execution command emitted at the end of a microroutine as determined by a first priority coder within the control unit. A second priority coder in the control unit establishes an order of precedence among different peripheral units which may call for an interruption of the processor program. A subunit within the control unit prevents the occurrence of program interruptions at the conclusion of two immediately consecutive microroutines, thus requiring the extraction of at least one new macroinstruction from the corresponding memory between successive interruptions. A single peripheral unit, therefore, can occupy the processor for a limited time only.

An interface unit associated with a peripheral unit of the low-speed type has been described and claimed in commonly owned U.S. patent application Ser. No. 913,232 filed June 6, 1978 by Armando Consigli and Roberto Danna; the disclosure of that application is hereby incorporated by reference into the present application. That interface unit includes a sequential network which is switchable from a quiescent state (D) to a preparatory state (A) in response to the appearance of an input/output instruction addressing the associated peripheral unit. Via an intermediate state (B), attained in the absence of an overriding priority as determined by preferential circuitry such as the two priority coders disclosed in Bambara et al application Ser. No. 839,883, the network is switched to an active state (C) in response to a data-ready signal from the associated peripheral unit. A program-suspension request sent out in this active state by the interface unit elicits from the processor a confirmation signal which initiates the data transmission called for by the input/output instruction; the confirmation signal also returns the sequential network to its quiescent state (D).

Telecommunication systems of the type here envisaged may also include peripheral units operating at a higher speed so as not to require any sustained program interruption at the processor. Such peripheral units may include, for example, line detectors monitoring the activities of respective communication channels. Thus, a high-speed peripheral unit may be given direct access (DMA) to the central memory of the processor for transferring thereto a series of data words from its own store or receiving such data words therefrom.

OBJECT OF THE INVENTION

The object of our present invention is to provide an interface unit, individually associated with a peripheral unit of the fast-operating type referred to above, which facilitates the transfer of data between that peripheral unit and the central processor memory in an expeditious manner and with due consideration of priority conditions and processor availability.

SUMMARY OF THE INVENTION

An interface unit according to our invention comprises a first sequential network, similar to the one disclosed in the above-identified Consigli et al application, switchable from a quiescent state (D') to a preparatory state (A') and thence, preferably via an intermediate state (B'), to an active state (C') before returning to its quiescent state. A second sequential network, normally in a waiting state (A"), is switchable—preferably via a transitory state (B")—to an operative state (C") and thence to a terminal state (D") before returning to its waiting state. When an input/output instruction has placed the first network in its state A', the second network leaves the state A" in the presence of a readiness signal from the peripheral unit, passes through state B" (if provided) in the absence of overriding priorities from other peripheral units of the same high-speed type, emits in state C" a request signal for the transmission or reception of a data word, and passes into state D" in response to a consent signal from the processor. In this terminal state the contents of two counters, initially loaded by the processor upon the readout of the input/output instruction, are modified. The count of one of these counters, representing the address of a storage cell in the central memory to or from which a data word is to be transferred, is incremented to give the next-following address while the count of the other counter, representing the number of data words yet to be transferred, is decremented. The same consent signal then restores the waiting state A" whereupon the cycle is repeated as long as the word counter has a count different from zero (and in the absence of overriding priorities). At the same time, the control unit of the processor performs its microroutine, continuing the operating program. When the word counter has been emptied, the second network is halted in its position A" while the first network is stepped through its several positions to the quiescent state D' after emitting in its active state C' a signal, such as the aforementioned program-suspension request, indicating that the transfer of all the data words called for in the input/output instruction has been completed.

BRIEF DESCRIPTION OF THE DRAWING

The above and other features of our invention will now be described in detail with reference to the accompanying drawing in which:

FIG. 2 diagrammatically illustrates a preferential chain including a number of peripheral units;

FIG. 3 is a schematic representation of an input/output instruction emitted by the processor of FIG. 1;

FIGS. 5 and 6 are flow diagrams illustrating the mode of operation of two sequential networks included in the interface unit of FIG. 4.

SPECIFIC DESCRIPTION

Figure 1:
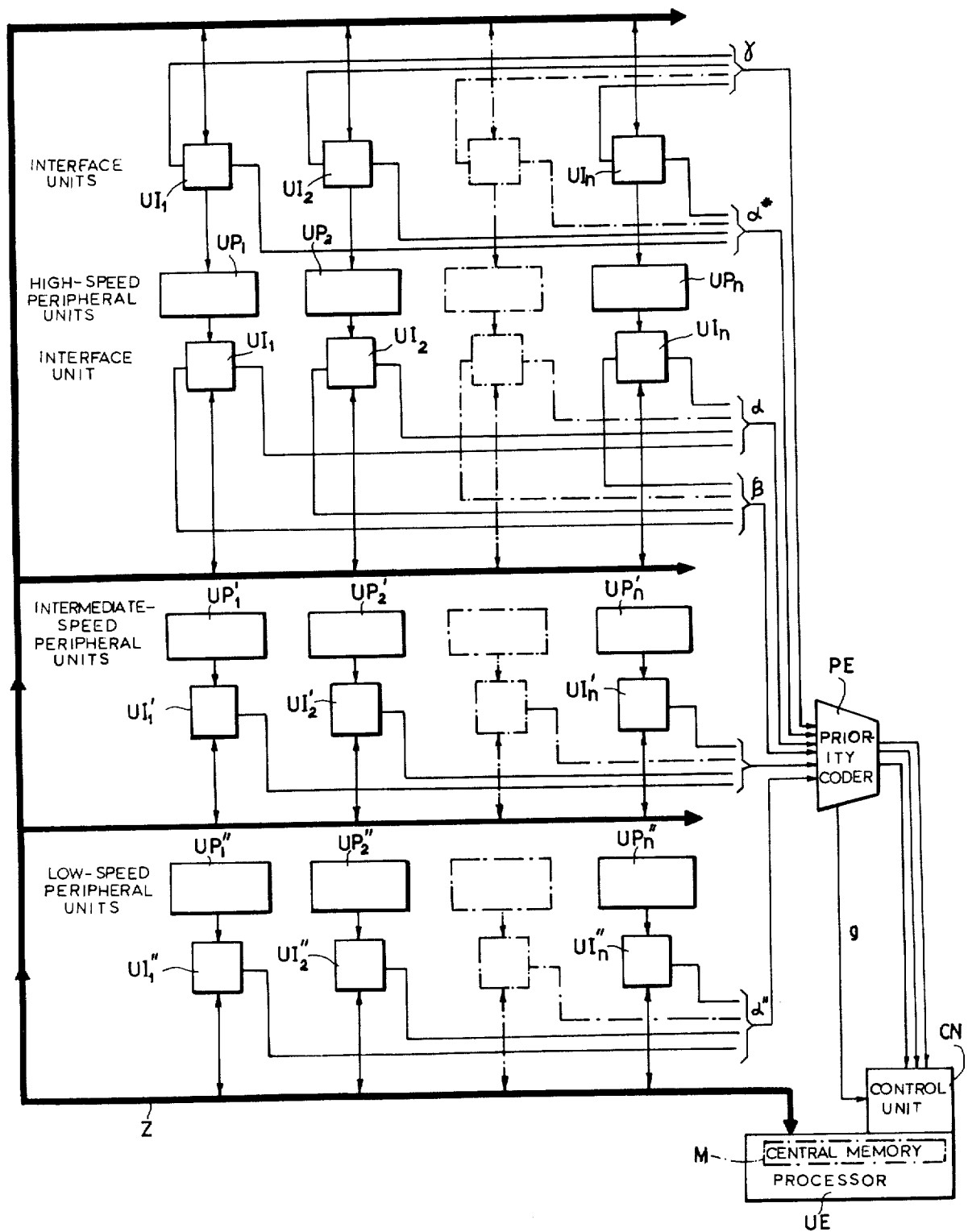
FIG. 1 is a block diagram showing a multiplicity of peripheral units and associated interface units served by a processor in a data-handling system embodying our invention.

In FIG. 1 we have shown part of an electronic data-handling system including a central processor UE and a multiplicity of peripheral units, the latter being arranged in several levels $UP_1$, $UP_2$, ... $UP_n$, $UP_1'$, $UP_2'$, ... $UP_n'$, $UP_1''$, $UP_2''$, ... $UP_n''$ of different ranks. (The number of units per level need not be the same.) Each peripheral unit is individually associated with an interface unit respectively designated $UI_1$, $UI_2$, ... $UI_n$, $UI_1'$, $UI_2'$, ... $UI_n'$, $UI_1''$, $UI_2''$, ... $UI_n''$; units $UP_1$-$UP_n$ are also associated with a second set of interface units $UI_1^*$, $UI_2^*$, ... $UI_n^*$. It may be assumed, by way of example, that peripheral units $UP_1''$-$UP_n''$ are of the slow-operating type, associated with interface units $UI_1''$-$UI_n''$ of the kind disclosed in the Consigli et al application, whereas units $UP_1'$-$UP_n'$ operate at a higher speed not requiring any program interruption; units $UP_1$-$UP_n$ are of the fast-operating type allowing the exchange of data with the processor by direct access (DMA) to its central memory. A priority coder PE has different inputs for the several levels; for the sake of clarity, coder PE is shown separate from a control unit CN of processor UE even though it may actually form part of that control unit, as shown in the aforementioned Bambara et al application Ser. No. 839,883 whose disclosure is hereby incorporated by reference into the present application.

The interface units associated with the several groups of peripheral units communicate with corresponding inputs of coder PE via respective leads carrying a program-suspension request α or α" in the case of high-speed units $UP_1$-$UP_n$ or low-speed units $UP_1''$-$UP_n''$, respectively. Signal α" appears whenever a corresponding peripheral unit is about to transmit data to the processor UE, initiating a program interruption as described in the Bambara et al application; it also gives rise to a signal g, sent to control unit CN for inhibiting further suspension requests during interruption of the program. It should be noted that the processor temporarily deactivates any peripheral unit from which a suspension request is being received; in its deactivated condition, a peripheral unit can only transmit its accumulated data to the processor, within the time interval allocated for such transmission, but cannot generate new data.

Signal α, emitted by interface units $UI_1$-$UI_n$, or its counterpart α*, emitted by interface units $UI_1^*$-$UI_n^*$, causes only a short-time program interruption inasmuch as the transfer of data has already taken place at the time of its appearance; this signal, therefore, merely serves to inform the processor or its control unit that the required number of data words, as specified by the processor upon the occurrence of the instruction giving rise to the transfer, have been written into the central memory M of processor UE (input instruction) or read out therefrom (output instruction). These two types of macroinstructions, collectively referred to as input/output instructions, may differ from each other only in the position of one bit. Coder PE establishes a predetermined order of priorities for the program-suspension requests, not only among the several groups of interface units but also among the units within each group.

Input instructions destined for peripheral units $UP_1$-$UP_n$ result in the intervention of interface units $UI_1$-$UI_n$; output instructions addressed to these same peripheral units are handled by interface units $UI_1^*$-$UI_n^*$. These two sets of interface units also transmit to the processor, via coder PE and control unit CN, respective transfer requests β and γ. An order of precedence also exists in regard to the emission of these transfer requests from the various interface units, thanks to a preferential chain in which units $UP_1$-$UP_n$ are connected.

Thus, FIG. 2 shows interrogation signals $\Delta_1$, $\Delta_2$, ... $\Delta_n$ fed to peripheral units $UP_1$, $UP_2$, ... $UP_n$ from the associated interface units $UI_1$, $UI_2$, ... $UI_n$ (FIG. 1) and the retransmission of response signals $p_1''$, $p_2''$, ... $p_n''$, representing negated preference signals, to these interface units. Since the first unit $UP_1$ is not preceded by any higher-ranking unit in the chain, signals $\Delta_1$ and $p_1''$ are identical. Signal $p_1''$, when present, reaches an inverting input of an AND gate $G_2$ in unit $UP_2$ having a noninverting input connected to unit $UI_2$ (FIG. 1) for receiving therefrom the interrogation signal $\Delta_2$. In the absence of a higher-ranking interrogation signal $\Delta_1$, AND gate $G_2$ conducts in response to signal $\Delta_2$ and emits the response signal $p_2''$ which is passed by an OR gate $O_2$ further down the chain. OR gate $O_2$ also receives the signal $p_1''$ from the preceding stage, if present. The other peripheral units have AND and OR gates analogous to those of unit $UP_2$, except for the last unit $UP_n$ which has only an AND gate $G_n$ since there is no need for passing the signal $p_n''$ to any subsequent unit. Signal $p_n''$, of course, comes into existence only when interrogation signal $\Delta_n$ is generated by unit $UI_n$ (FIG. 1) and no corresponding signals are fed to the preceding peripheral units.

The communication path between the processor UE and the several peripheral units comprises a bidirectional buz Z extending between the processor and the associated interface units. FIG. 3 illustrates schematically an input/output instruction (differing somewhat from the corresponding instruction in the Bambara et al application) which can be read out on this bus from a program memory within the processor, under the control of a program counter, to command the exchange of data between the processor and a particularly designated peripheral unit.

The macroinstruction shown in FIG. 3 consists of 24 bit positions divided into five sections. Positions $I_{23}$-$I_{16}$ define an 8-bit operative code distinguishing the several types of instructions from one another. Positions $I_{15}$-$I_{13}$ constitute a 3-bit microcommand section serving, for example, to provide timing signals required in the operation of the peripheral unit to which the instruction is addressed. Positions $I_{12}$ and $I_{11}$ form a 2-bit code designed to alter the state of the peripheral unit (or, more precisely, of a sequential network in the associated interface unit as more fully described hereinafter). Positions $I_{10}-I_7$ constitute a 4-bit function code indicating the type of input/output operation to be carried out; two of these bits (specifically those in positions $I_9$ and $I_{10}$) discriminate between input and output instructions. Finally, positions $I_6-I_0$ represent a 7-bit address code of the peripheral unit concerned.

Figure 4:
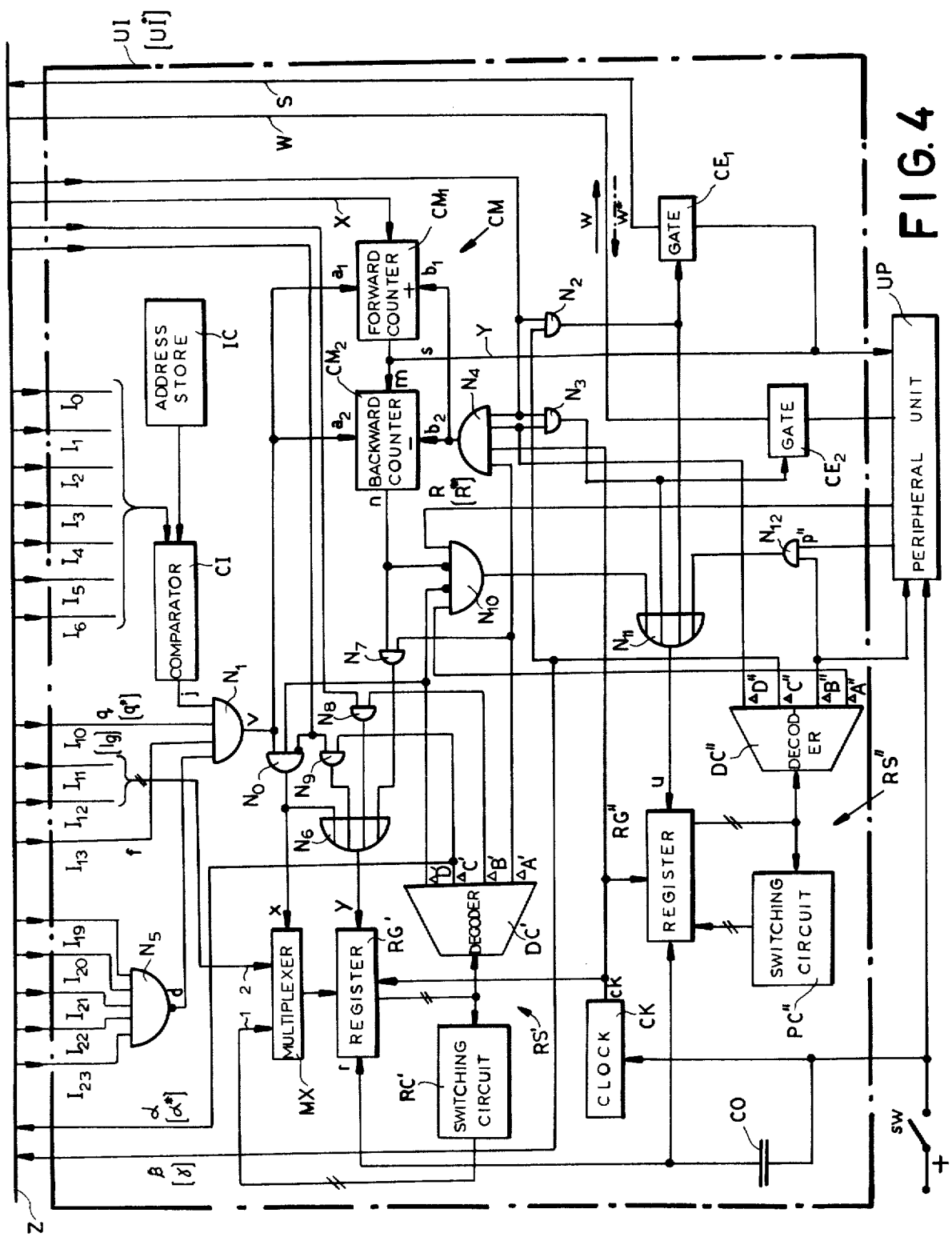
FIG. 4 is a more detailed diagram of an interface unit representative of a group of such units shown in FIG. 1.

FIG. 4 shows a unit UI, representative of any of the interface units $UI_1-UI_n$ of FIG. 1, together with the associated peripheral unit UP. Its companion unit UI* is identical, except for certain details described below.

Interface unit UI comprises two sequential networks RS', RS''. Network RS' includes a multiplexer MX, a two-bit register RG' and a switching circuit RC'. A two-conductor multiple, indicated schematically, connects these components in a closed loop, with circuit RC' working into a first input 1 of multiplexer MX which is also provided with a second input 2 connected to two leads of bus Z carrying the bits $I_{11}$ and $I_{12}$ of an input/output instruction. Multiplexer MX normally stands on its input 1 but is shiftable to its input 2 by a signal x issuing from an AND gate $N_0$. The bit combination stored in register RG' determines the state of network RS'; thus, for example, the quiescent state D' may be represented by the configuration 0, 0, the preparatory state A' may be defined by bits 0, 1, the intermediate state B' may have the configuration 1, 0 and the active state C' may be marked by bits 1, 1. Switching network RC', in that case, can be a simple binary incrementer which reads out the bits 1, 0 (state B'), 1, 1 (state C') and 0, 0 (state D') upon receiving, respectively, the bits 0, 1 (state A'), 1, 0 (state B') and 1, 1 (state C') at its input. With register RG' in state D', however, the bit combination 0, 0 is passed unchanged by circuit RC' to multiplexer input 1.

A decoder DC' is connected to the output of register RG', in parallel with switching circuit RC', to mark the existence of any of the network states A'-D' by energizing a corresponding output lead with a respective signal $\Delta_{A'}$, $\Delta_{B'}$, $\Delta_{C'}$ or $\Delta_{D'}$. A clock circuit CK, suitably synchronized with a time base in the processor, emits a train of equispaced pulses ck commanding the loading of register RG' with a new bit combination from the output of multiplexer MX in the presence of an enabling signal y. When the system is first taken into operation, clock circuit CK and other components are energized by connection to a power-supply terminal (+) upon closure of a manual switch SW. The resulting pulse is passed by a capacitor CO to a resetting input r of register RG' for initial establishment of the quiescent state D' therein.

The enabling signal y, originating at an OR gate $N_6$, is given by $$y = x + n \cdot \Delta_{A'} + p' \cdot \Delta_{B'} + k' \cdot \Delta_{C'}$$

where n is a zero-count signal coming from a storage circuit CM, p' is an authorization signal sent out by control unit CN to indicate the absence of overriding priorities, and k' is an acknowledgment signal arriving from the processor UE in response to a suspension request α emitted by unit UI; the request signal α, it will be noted, is branched off the signal $\Delta_{C'}$ in the output of decoder DC'. Signals $\Delta_{A'}$, $\Delta_{B'}$ and $\Delta_{C'}$ are fed to three AND gates $N_7$, $N_8$ and $N_9$ also receiving the signals n, p' and k', respectively; these AND gates work into respective inputs of OR gate $N_6$ which also receives the signal x from AND gate $N_0$.

Signal x is given by $$x = j \cdot d \cdot f \cdot \Delta_{D'} \cdot \overline{k'} \cdot q$$

where j, d, q and f represent four signals available in the presence of an input/output instruction intended for peripheral unit UP. Signal f is a state-change command represented by a bit appearing in one of the bit positions of microcommand section $I_{15}-I_{13}$ shown in FIG. 2, here specifically position $I_{13}$. Signal d identifies the macroinstruction present on bus Z as an input/output instruction characterized, for example, by a "0" in each of the first five bit positions $I_{23}-I_{19}$ as in the system of the prior Bambara et al application; this signal is thus delivered by a NAND gate $N_5$ with inputs connected to the leads carrying these five bits. Signal q, in bit position $I_{10}$, characterizes the instruction as being of the input type, calling for the services of unit UP; if it were of the output type, the companion unit UI* would be summoned by a signal q* in bit position $I_9$, as indicated in brackets. Signal j indicates that the instruction is indeed destined for the peripheral unit UP associated with the interface unit UI here considered; the address code of this peripheral unit is hard-wired in a store IC connected via a 7-lead multiple to an input of a comparator CI whose other input receives the bits $I_6-I_0$ of the address section via a similar multiple, comparator CI emitting the signal j when the two codes are identical. An AND gate $N_1$, accordingly, receives signal d from NAND gate $N_5$, signals f and q from bus Z and signal j from comparator CI to generate a signal v fed to NAND gate $N_0$ along with signal $\Delta_{D'}$ from decoder DC'; an inverting input of gate $N_0$ receives the signal k' from bus z.

Storage circuit CM comprises a pair of cascaded binary counters $CM_1$ and $CM_2$ linked with bus z via an input multiple X. An output multiple Y of counter $CM_1$ extends not only to the input of counter $CM_2$ but also to peripheral unit UP. A branch S of this multiple includes a normally blocked transfer gate $CE_1$ and terminates at bus Z. Another multiple W extends between but Z and unit UP by way of a normally blocked transfer gate $CE_2$.

The output signal v of AND gate $N_1$, generated in the presence of an input instruction, is also delivered to respective enabling inputs $a_1$, $a_2$ of counters $CM_1$, $CM_2$ to facilitate the loading thereof via multiple X.

In a first clock cycle following the appearance of that instruction, the processor sends out a binary code m whose numerical value corresponds to the number of data words to be transferred in the course of a microroutine established by control unit CN (FIG. 1). In the next clock cycle, with enabling inputs $a_1$ and $a_2$ still energized, multiple X carries another binary code s constituting a starting address for the series of data transfers thus initiated; that starting address identifies the first location in central memory M (FIG. 1) in which a data word read out from peripheral unit UP is to be written; that code s also goes to the peripheral unit for indicating the storage cell thereof containing the data word. The loading of counter $CM_1$ with address code s transfers the previously stored code m to counter $CM_2$ which thereupon cancels the zero-count signal n normally emitted therefrom.

For the sake of simplicity, the circuits connecting counters $CM_1$ and $CM_2$ with clock CK have not been illustrated.

Sequential network RS" is similar to network RS' except for the omission of multiplexer MX. Thus, network RS" comprises a two-bit register RG" with a feedback loop including a switching circuit RC" whose operation is analogous to that of circuit RC"; when reset by a pulse from capacitor CO upon closure of switch SW, register RG" assumes the state A". Register RG" works into a decoder DC" with four output leads energized by respective signals $\Delta_{A''}$, $\Delta_{B''}$, $\Delta_{C''}$, $\Delta_{D''}$ when the network is in its waiting state A", its transitory state B", its operative state C", or its terminal state D". Signal $\Delta_{A''}$ goes to a noninverting input of an AND gate $N_{10}$ receiving, on another noninverting input, a readiness signal R from peripheral unit UP when that unit is in a position to read out data words to be transferred to central memory M. (In the case of interface unit UI*, a signal R* would indicate that unit UP is ready to receive data words read out from memory M.) Two inverting inputs of AND gate $N_{10}$ receive the zero-count signal n from backward counter $CM_2$ and the output signal $\Delta_{D'}$ of decoder DC'.

A consent signal k", emitted by the processor in response to a transfer request $\beta$ (or $\gamma$) and in the absence of overriding priorities, is delivered from bus Z to respective inputs of three AND gates $N_2$, $N_3$ and $N_4$. AND gate $N_4$, whose other inputs receive decoder signals $\Delta_{A'}$ and $\Delta_{D'}$ as well as clock pulses ck, works into a forward-stepping input $b_1$ of address counter $CM_1$ and into a backward-stepping input $b_2$ of word counter $CM_2$. The outputs of AND gates $N_2$ and $N_3$ are connected to respective unblocking inputs of transfer gates $CE_1$ and $CE_2$.

An OR gate $N_{11}$ has four inputs respectively tied to the outputs of AND gates $N_2$, $N_3$, $N_{10}$ and a further AND gate $N_{12}$, the latter receiving the output signal $\Delta_{B''}$ from decoder DC" and the negated preference signal p" from peripheral unit UP. Signal $\Delta_{B''}$ (corresponding to signals $\Delta_1$-$\Delta_n$ of FIG. 2) is also delivered to that peripheral unit. Thus, signal u in the output of OR gate $N_1$ is given by $$u = \overline{n} \cdot \overline{\Delta_{D'}} \cdot R \cdot \Delta_{A''} + p' \cdot \Delta_{B''} + k' \cdot \Delta_{C''} + k'' \cdot \Delta_{D'}$$

This signal u, in the presence of a clock pulse ck, switches the sequential network RS" by loading its register RG" with the modified two-bit code appearing in the output of circuit RC", in a manner analogous to that described with reference to network RS' and stepping signal y.

OPERATION

The appearance of an input instruction on the conductors of bus Z loads the two counters $CM_1$ and $CM_2$ as described above, causing the disappearance of signal n. At the same time, network RS' is switched by the signal x from its quiescent state D' to its preparatory state A', as diagrammatically illustrated in FIG. 5, so that signal $\Delta_{D'}$ disappears along with signal n. In the presence of readiness signal R, and with network RS" in its waiting state A", AND gate $N_{10}$ conducts and generates the stepping signal u for register RG". Network RS", as diagrammatically illustrated in FIG. 6, is thus switched to its transitory state B" in which signal $\Delta_{B''}$ is transmitted to peripheral unit UP and opens the AND gate $N_{12}$ for the passage of response signal p" to OR gate $N_{11}$. The occurrence of this response signal, therefore, regenerates the stepping signal u so that network RS" switches to its operative state C" in which signal $\Delta_{C''}$ gives rise to the transfer request $\beta$ (or $\gamma$ in the case of unit UI*). Signal $\Delta_{C''}$ then opens the AND gate $N_2$ so that the arrival of consent signal k" from the processor once again produces the signal u whereby network RS" is switched to its terminal state D".

The unblocking of transfer gate $CE_1$ in state C" lets the address code s from counter $CM_1$ pass via multiple S and bus Z to the processor. When AND gate $N_3$ opens in state D", transfer gate $CE_2$ is unblocked so that a data word can pass to the designated memory address by way of multiple W as indicated by an arrow w; in the case of unit UI*, such a data word would travel in the opposite direction as indicated by an arrow w*.

The conduction of AND gate $N_4$ in state D" of network RS" (with network RS" still in its preparatory state A') increases the contents of counter $CM_1$ and reduces the contents of counter $CM_2$ by one unit; the incremented count of element $CM_1$ represents the memory address of the next transfer cycle while the decremented count of element $CM_2$ indicates the number of data words still to be transferred. If that number is different from zero, i.e. if signal n is still absent, the aforedescribed operations are repeated with a possible delay in state B" of network RS" until the processor emits again the consent signal k".

When, finally, the last data word of this series has been transferred, the reading of counter $CM_2$ is zero so that signal n reappears. At this point, AND gate $N_7$ conducts by virtue of the concurrence of signals $\Delta_{A'}$ and n so that stepping signal y is regenerated and network RS' switches to its state B'. In response to authorization signal p', indicative of the absence of overriding priorities, AND gate $N_8$ now conducts so that register RG' is stepped on the next clock cycle to assume the active state C'. This results in the emission of signal $\alpha$ branched off signal $\Delta_C$, indicating to the processor that the transfer operations have been completed. (In the case of unit UI*, signal $\alpha$* would be generated.) An acknowledgement signal k' from the processor then passes the AND gate $N_9$ whereupon network RS takes a further step to its quiescent state D'. Unit UI has now returned to its normal condition, awaiting the arrival of the next input instruction.

We claim:

1. In an electronic data-handling system wherein a processor serves a plurality of peripheral units adapted to exchange data with a central memory included in said processor, the latter being programmed to emit input/output instructions respectively directed to said peripheral units via a common transmission channel for initiating the transfer of a series of data words between said central memory and a selected peripheral unit, the combination therewith of an interface unit facilitating communication between an associated peripheral unit and said processor, said interface unit comprising:

a first sequential network switchable to a plurality of states including a quiescent state, a preparatory state and an active state;

input means connected to said transmission channel and effective in said quiescent state for switching said first network to said preparatory state in response to the appearance of an input/output instruction identifying the associated peripheral unit;

a second sequential network switchable to a plurality of states including a waiting state, an operative state and a terminal state;

first storage means connected to said transmission channel for loading by said processor with a starting address identifying the first one of a series of locations in said central memory involved in a transfer of a predetermined number of data words;

second storage means connected to said transmission channel for loading by said processor with a numerical value representing said predetermined number;

first stepping means for switching said first network from said preparatory state to said active state thereof, said first stepping means being ineffectual in the presence of a numerical value different from zero in said second storage means;

second stepping means effective in the presence of a numerical value different from zero in said second storage means for switching said second network, in the active state of said first network and in response to a readiness signal from the associated peripheral unit, from said waiting state to said operative state thereof, said second network emitting in said operative state a transfer-request signal to said processor, said second stepping means being responsive to a consent signal from said processor for advancing said second network to said terminal state and thence returning same to said waiting state; and circuit means effective in said terminal state of said second network for modifying the address registered in said first storage means and diminishing the numerical value registered in said second storage means, with resulting repetition of the switching cycle of said second network in the presence of a continuing readiness signal from the associated peripheral unit and in response to successive consent signals from said processor until said numerical value is reduced to zero, thereby enabling said first stepping means to switch said first network to said active state, said first network emitting in said active state a completion signal to said processor, said first stepping means being responsive to an acknowledgement signal from said processor for returning said first network to said quiescent state.

2. The combination defined in claim 1 wherein at least some of said peripheral units including said associated unit are interconnected in a preferential chain establishing an order of precedence among them, the states of said second network further including a transitory state temporarily established by said second stepping means between said waiting and operative states in the presence of a preference signal from a preceding peripheral unit.

3. The combination defined in claim 1 wherein said processor is provided with preferential circuitry for assigning different priority ratings to certain groups of peripheral units, the states of said first network further including an intermediate state temporarily established by said first stepping means between said preparatory and active states under the control of said preferential circuitry in the presence of an overriding priority.

4. The combination defined in claim 1, 2 or 3 wherein each of said networks comprises a register for the storage of bit combinations representing said states, each of said stepping means including a switching circuit connected to the respective register for feeding back thereto modifications of the stored bit combinations representing the next-following states in the sequence.

5. The combination defined in claim 1 wherein said first storage means comprises a forward counter with an incrementing input connected to said circuit means, said second storage means comprising a backward counter with a decrementing input connected to said circuit means, said counters having enabling inputs connected to a comparison circuit for verifying the presence of an input/output instruction identifying the associated peripheral unit.

6. The combination defined in claim 5 wherein said counters are connected in cascade for transferring said predetermined number, received from said processor ahead of said starting address, from said channel by way of said forward counter to said backward counter.

7. The combination defined in claim 1, 2, 3, 5 or 6 wherein said interface unit further comprises first gating means, inserted between said channel and an output of said first storage means, and second gating means, inserted between said channel and the associated peripheral unit, said first gating means being controlled by said second network for permitting the transmission of a registered address from said first storage means to said processor in said operative state and in the presence of said consent signal, said second gating means being controlled by said second network for permitting the transfer of a data word between said central memory and the associated peripheral unit in said terminal state and in the presence of said consent signal.

* * * * *